A. L. HANSEN.
ACETYLENE GAS LANTERN.
APPLICATION FILED JUNE 8, 1912.
1,228,772.
Patented June 5, 1917.
2 SHEETS—SHEET 1.
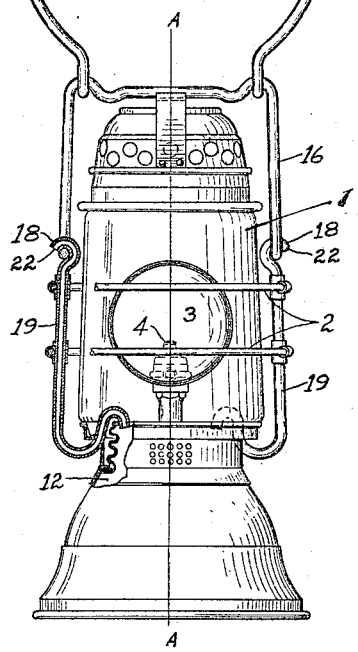

A. L. HANSEN.
ACETYLENE GAS LANTERN.
APPLICATION FILED JUNE 8, 1912.

1,228,772.

Patented June 5, 1917.
2 SHEETS—SHEET 2.

UNITED STATES PATENT OFFICE.

AUGIE L. HANSEN, OF CHICAGO, ILLINOIS, ASSIGNOR TO JUSTRITE MANUFACTURING COMPANY, OF CHICAGO, ILLINOIS, A CORPORATION OF ILLINOIS.

ACETYLENE-GAS LANTERN.

1,228,772.   Specification of Letters Patent.   Patented June 5, 1917.

Application filed June 8, 1912. Serial No. 702,403.

*To all whom it may concern:*

Be it known that I, AUGIE L. HANSEN, a citizen of the United States, residing at Chicago, county of Cook, and State of Illinois, have invented a certain new and useful Improvement in Acetylene-Gas Lanterns, of which the following is a specification.

My invention relates to that class of lanterns which are used by car conductors or mine inspectors and for other similar purposes, and has for its object to provide a lantern, which will retain a sufficient quantity of gas to permit of its igniting at any time by the opening of a valve and bringing the gas in contact with the flame; and to also provide means whereby an undue pressure of gas will operate to raise a column of water, thereby automatically lowering the level of the water feed, and in this manner causing the continued generation of gas to cease.

My means of accomplishing the foregoing may be more readily understood by having reference to the accompanying drawings, which are hereunto annexed and are a part of this specification, in which:

Figure 1 is a side elevation, a portion of the lantern being shown in section.

Fig. 2 is a fragmentary top or plan view of the same.

Figure 3:
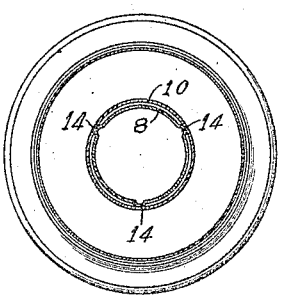
Fig. 3 is a cross section taken on the line x—x in Fig. 4.
Figure 4:
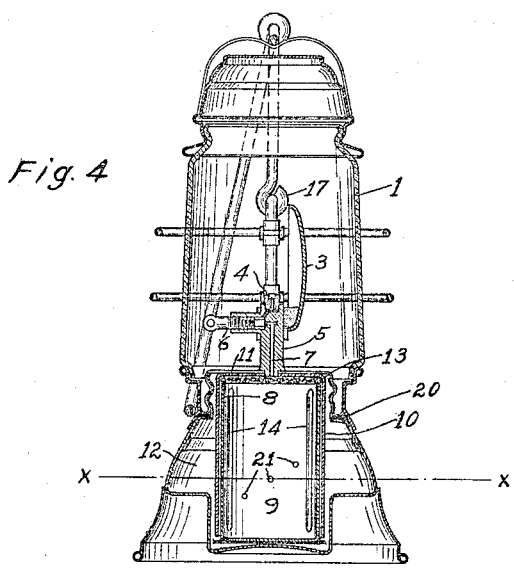
Fig. 4 is a vertical sectional view taken on the line a—a in Fig. 1, the handle being lowered instead of raised, as in Fig. 1.

As shown in the drawings, the lantern is provided with a glass globe 1, which is provided with wire guards 2 of the usual form. 3 is the reflector, which may be of any desired construction. 4 is the burner tip, which is mounted in the upwardly extending member 5, which is provided with a valve 6 for the purpose of closing off the flow of gas to the burner tip 4.

This upwardly extending member is provided with an internal passage 7, which is in communication with the gas chamber 8. 9 is the carbid receptacle, which is a cylinder, which telescopes inside of a downwardly depending cylindrical member 10, which is secured to the bottom wall 11 of the upper part of the lantern.

12 is the water chamber, from which the water is supplied to the carbid for the purpose of generating the gas. 13 is a washer of felt or other suitable material for filtering the gas prior to its entering the passage 7.

14 are ribs or corrugations formed on the side walls of the carbid receptacle, so as to preserve a uniform space intermediate the downwardly depending cylinder 10 and the carbid receptacle 9. 15 is the handle which is secured to the rod or wire 16, which is formed with eyes 17 adapted to engage hooks 18 formed at the end of two tubes 19.

These tubes 19 as clearly shown by Fig. 1 of the drawings have one of their ends in communication with the water chamber, adjacent the upper portion thereof, from where they curve downwardly and upwardly to a point substantially intermediate the length of the globe 1, at which point they are curved to form hooks 18. In lamps of this character which are being constantly swung and moved, in carrying out their purpose, it is obvious that an unusual amount of water passes to the carbid, thereby generating an excessive amount of gas. Further, it might be stated that, due to the structure of the tubes 19, the water is prevented from passing from the water chamber, since the water which might pass into the tubes 19 assumes various levels therein, with the result that the water is confined in the tubes.

As shown in Fig. 1, one of these tubes is shown in section and it is shown leading to the interior of the water chamber 12.

The operation of the lantern is as follows:

The water chamber 12 is filled, the carbid receptacle being placed in position, the water receptacle is screwed into place, a rubber gasket 20 serving to make a gas tight joint between the upper part of the lantern and the water chamber.

The water flows through a plurality of perforations 21 formed in the side walls of the receptacle and generates the gas, and upon opening the valve 6 and placing a lighted match at the burner 4, the gas immediately ignites. The height of the flame may be varied with great nicety by means of the valve 6.

It frequently happens in a lantern of this kind that an excess amount of gas is generated, caused by shaking the lantern or swinging it violently for the purpose of giving signals.

This results in generating a larger amount of gas than the burner can consume and is liable to cause an accident. I prevent this possibility by providing for a water feed between the water receptacle 9 and the downwardly depending cylinder 10, so that as soon as an excess pressure of gas is generated, it will force the water down below the lowest one of the perforations 21, and no further gas will be generated until a portion of that already formed is burned. When the pressure is lowered the water will automatically rise in the other annular chamber and again contact with the carbid and generate an additional supply of gas. Under normal conditions this control of the water feed is sufficient to prevent an excess of gas being generated, but it is obvious that when the lantern is violently whirled about in the air, that the water will be splashed up into the carbid regardless of the pressure, and I take care of this excessive pressure by means of the tubes 19, which extend into the water supply, and any undue amount of pressure will operate to force the gas through the water into the tubes, and it will continue to rise in the said tubes until it will eventually escape from the openings 22 at the upper ends of the said tubes. In this manner I absolutely obviate any danger from an accident, due to any excessive agitation of the lantern.

Having described my invention, what I regard as new and desire to secure by Letters Patent is:

An acetylene gas lantern including a water tank, a carbid receptacle and gas chamber, a burner in the lantern proper, a tube forming a handle support, the tube having one of its ends curved downwardly and outwardly and extending into the water chamber to provide an exhaust pipe, the central portion thereof extending upwardly and the extreme upper end being curved to provide a hook to receive a handle bail.

In witness whereof I have signed the foregoing specification.

AUGIE L. HANSEN.

Witnesses:
K. DOLBEY,
C. M. BAUMEISTER.

Copies of this patent may be obtained for five cents each, by addressing the "Commissioner of Patents, Washington, D. C."